US010201062B2

(12) United States Patent
Arndt et al.

(10) Patent No.: US 10,201,062 B2
(45) Date of Patent: Feb. 5, 2019

(54) VEHICLE-BASED LIGHTING CONTROL

(71) Applicant: FORD GLOBAL TECHNOLOGIES, LLC, Dearborn, MI (US)

(72) Inventors: Christoph Arndt, Rheinland-Pfalz (DE); Uwe Gussen, Huertgenwald (DE); Frederic Stefan, Aachen (DE); Frank Petri, Erftstadt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/928,747

(22) Filed: Mar. 22, 2018

(65) Prior Publication Data

US 2018/0279453 A1 Sep. 27, 2018

(30) Foreign Application Priority Data

Mar. 27, 2017 (DE) ........................ 10 2017 205 075

(51) Int. Cl.
*B60Q 1/26* (2006.01)
*H05B 37/02* (2006.01)

(52) U.S. Cl.
CPC ................................ *H05B 37/0272* (2013.01)

(58) Field of Classification Search
CPC ........ B60Q 2900/30; B60Q 1/26; B60Q 1/38; B60Q 1/46; B60Q 1/488; B60Q 2300/3321; H05B 37/02; H05B 37/0209; H05B 37/0245; H05B 37/0272; H04B 10/00;

(Continued)

(56) References Cited

U.S. PATENT DOCUMENTS 8,475,002 B2 * 7/2013 Maxik ........................ F21S 2/00 362/157
8,519,624 B2 * 8/2013 Hattori ................. B60Q 1/1423 315/157

(Continued)

FOREIGN PATENT DOCUMENTS

DE 102013002876 A1 8/2014
DE 102013002876 B4 8/2014

(Continued)

OTHER PUBLICATIONS

DE Examination Report for DE 10 2017 205 075.6 dated Oct. 24, 2017, 7 pages.

(Continued)

*Primary Examiner* — Jason Crawford
(74) *Attorney, Agent, or Firm* — Brooks Kushman P.C.; Frank MacKenzie

(57) ABSTRACT

Infrastructure lighting is controlled from a vehicle. Wireless communication exists between the vehicle and at least one light source of the infrastructure lighting. At least one device of the vehicle is functionally linked to the infrastructure lighting. Switching on a light source of the infrastructure lighting is performed via wirelessly transmitting a first control command to the light source. Switching off the light source is performed via transmitting a second control command to the light source. A blinker is functionally linked to the light source such that activation of the blinker triggers the transmitting of the first control command to light source when vehicle headlights are switched on.

20 Claims, 2 Drawing Sheets

(58) Field of Classification Search
CPC .. H04B 10/114; H04B 10/116; H04B 10/2587
See application file for complete search history.

(56) References Cited

U.S. PATENT DOCUMENTS

| | | | | |
|---|---|---|---|---|
| 8,766,545 | B2 * | 7/2014 | Wilsher | H05B 37/02 315/151 |
| 9,165,310 | B2 | 10/2015 | Liu et al. | |
| 9,493,109 | B2 | 11/2016 | Nordbruch et al. | |
| 9,560,720 | B2 * | 1/2017 | Hartman | G08G 1/087 |
| 2008/0292320 | A1 * | 11/2008 | Pederson | H04B 10/1143 398/128 |
| 2008/0310850 | A1 * | 12/2008 | Pederson | G07C 9/00158 398/135 |
| 2009/0009089 | A1 * | 1/2009 | Burkett | B60Q 1/1423 315/82 |
| 2009/0189756 | A1 * | 7/2009 | Wu | B60Q 1/34 340/475 |
| 2010/0029268 | A1 * | 2/2010 | Myer | F21S 2/00 455/426.1 |
| 2010/0201267 | A1 * | 8/2010 | Bourquin | H05B 37/0227 315/32 |
| 2011/0238299 | A1 * | 9/2011 | Nguyen | G01C 21/3469 701/408 |
| 2012/0126721 | A1 | 5/2012 | Kuenzler et al. | |
| 2013/0057158 | A1 | 3/2013 | Josefowicz et al. | |
| 2014/0001961 | A1 * | 1/2014 | Anderson | H05B 37/0227 315/153 |
| 2015/0127251 | A1 * | 5/2015 | Chen | G01C 21/206 701/487 |
| 2015/0173156 | A1 * | 6/2015 | Pedersen | H05B 37/0272 315/151 |
| 2015/0319825 | A1 * | 11/2015 | Destine | H05B 37/0227 315/153 |
| 2017/0042003 | A1 * | 2/2017 | Logvinov | H05B 37/0272 |
| 2017/0339326 | A1 * | 11/2017 | Rycenga | B60R 11/04 |

FOREIGN PATENT DOCUMENTS

| | | | |
|---|---|---|---|
| DE | 102013102962 | A1 | 10/2014 |
| DE | 102014206312 | A1 | 12/2015 |
| WO | 2015160859 | A1 | 10/2015 |

OTHER PUBLICATIONS

Samir A. Elsagheer Mohamed, “Smart Street Lighting Control and Monitoring System for Electrical Power Saving by Using VANET” Int. J. Communications, Network and System Sciences, Aug. 2013, pp. 351-360.

Sakshi Anand and Dr. Neelu Jain, “Intelligent Street Light System using Wireless Transmission: A Review” International Journal of Advanced Research in Electronics and Communication Engineering (IJARECE) vol. 4, Issue 2, Feb. 2015, pp. 271-275.

* cited by examiner

VEHICLE-BASED LIGHTING CONTROL

CROSS-REFERENCE TO RELATED APPLICATIONS

This application claims foreign priority benefits under 35 U.S.C. § 119(a)-(d) to DE Application 10 2017 205 075.6 filed Mar. 27, 2017, which is hereby incorporated by reference in its entirety.

TECHNICAL FIELD

The present disclosure relates to a method to control infrastructure lighting from a vehicle.

BACKGROUND

Street lighting is used to enable and improve vision during darkness. Street lighting often comprises streetlights. In addition to allowing adjustment to light conditions that depend on a time of day, intelligent lighting systems allow adjustment of an operation of lighting devices to a current requirement, with a goal of saving energy to operate the lighting devices. Thus, there are approaches to control the operation of street lighting via GPS-based data that take into account a time of sunrise and sunset corresponding to a latitude (US 2013/0057158 A1). Street lighting may also be controlled from a vehicle (DE 10 2013 002 876 B4). It is desirable to control street lighting in such a way that it harmonizes with lighting of the vehicle.

SUMMARY

This object is achieved via a method as claimed in claim 1. Additional advantageous exemplary embodiments and arrangements of the present disclosure result from the ancillary claim and the subclaims, the figures, and the exemplary embodiments.

A first aspect of the present disclosure relates to a method to operate a system comprising at least one vehicle and infrastructure lighting comprising at least one light source, wherein the vehicle and the light source are configured for wireless communication. The method includes the steps of:

- transmitting a control command to the light source,
- switching on the light source,
- transmitting a second control command to the light source,
- switching off the light source.

According to the present disclosure, at least one device of the vehicle is functionally linked to the light source.

The method is advantageous because it expands the conventional use of available lighting devices. Furthermore, the efficiency of vehicle devices is improved by coupling them to external light sources.

Preferably, in the method according to the present disclosure, a street lighting device is used as a lighting source, and is switched on at a certain distance as the vehicle approaches, if headlights of the vehicle are switched on. In this case, for example, a streetlight is used as a street lighting device. As a result, advantageously, electric power is then needed only when a vehicle approaches and is present in the area of a section of the street illuminated by the street lighting device. The street lighting device is then switched off again.

Advantageously, in the method according to the present disclosure, a street lighting device, which is on a street that branches off the street on which the vehicle is present, is used as a light source, and is switched on if a blinker of the vehicle is activated with respect to the direction of a branching street. In this case, not only is the street lying directly ahead illuminated, but also the branching street into which the vehicle is to be driven is illuminated. Thus, firstly, lighting of the branching street has an advantage of assisting navigation of the vehicle per se, since a driver recognizes a street into which the vehicle is to turn. Secondly, lighting of the branching street has the advantage that better lighting conditions generally exist in the area of the junction, thus also ensuring greater safety.

Furthermore, in the method according to the present disclosure, it is preferred if a lighting device of a bicycle path is used as a light source, and is switched on at a certain distance as a vehicle approaches, if the headlights of the vehicle are switched on. In this case, the vehicle may be present both on the bicycle path (and may thus ideally be a bicycle) and on a street that is adjacent to the bicycle path and/or runs parallel to it. In this way, advantageously, both the sighting and the safety of bicyclists, who are otherwise frequently easily overlooked by drivers of other vehicles due to limited visibility, are increased, particularly when turning or when making turning maneuvers. A type of lighting of the bicycle path may be advantageously specially designed, for example, in the form of arrows which, for example, draw the attention of the driver to a bicyclist on the bicycle path.

In an additional preferred embodiment of the method according to the present disclosure, the device of the vehicle that is functionally linked to the light source is a navigation device, wherein the light source is switched on at a certain distance of the vehicle from a programmed destination. In this case, the light sources may advantageously be provided with a direction-setting function. Therefore, it is particularly preferred if at least one street lighting device is used as a light source, and is arranged in the direction of the destination in order to advantageously facilitate the route guidance of the vehicle, in addition to the instructions of the navigation device.

In this case, it is furthermore preferred if a street lighting device that is arranged in an area of a destination is used as a light source. In this way, in addition to following the instructions of the navigation device, the driver's visibility is improved for finding the destination in the dark. The safety of the driver of the vehicle is simultaneously increased. In this sense, the street lighting that is activated by the navigation device at the destination location may also be referred to as a coming-home light.

Furthermore, it is preferred if the light source is lit in a certain pattern, for example, in time intervals, or is individually programmed. The light source may, for example, be lighting of a parking space that is reserved for the vehicle and is advantageously convenient for the driver to find via the lighting pattern. In addition or alternatively, as described above, the street lighting in the form of streetlights may also be activated in such a way that it acts as a guidance light to guide to the parking place or a suitable destination. This is advantageous particularly in an unknown area. In a similar way, a driver may, for example, also be guided to a free parking place, which would otherwise be hard to find in the dark.

In another advantageous embodiment, the light source is switched on if an approach alarm is triggered by the vehicle or an additional external device. Additional advantageous options include, for example, the illumination of vehicles which are stranded or have been involved in an accident, construction sites, dangerous curves, etc., which should be visible from a distance.

A second aspect of the present disclosure relates to a vehicle that is configured to carry out the method according to the present disclosure.

The present disclosure will be explained in greater detail based on the Figures. The following are shown:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
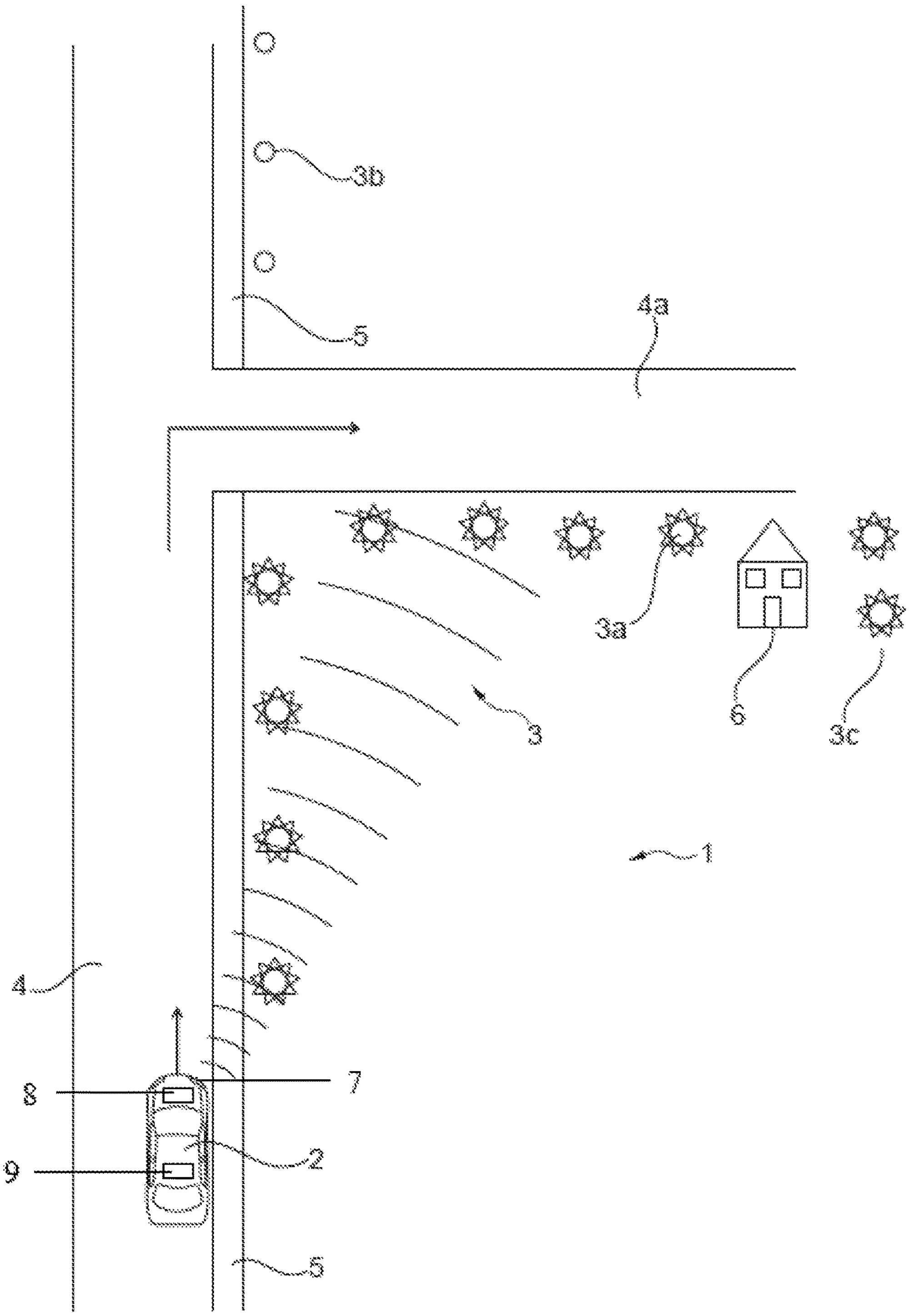
FIG. 1 shows a schematic representation of communication between a vehicle and street lighting.

FIG. 1 shows a system 1 made up of a vehicle 2 and an arrangement of light sources 3 in the form of infrastructural lighting devices, in particular streetlights 3. The vehicle 2 is a four-wheel motor vehicle. Alternatively, the vehicle 2 may, for example, be another motor vehicle, for example, a motorcycle, or a bicycle. The vehicle 2 is present on a street 4. A traveling direction is indicated by arrows. The vehicle 2 and the streetlights 3 are configured for wireless communication, as indicated by the wavy lines emanating from the vehicle. Devices for wireless communication are known to those skilled in the art. For wireless communication, for example, the information of a navigation device 9 or one or multiple lighting devices may be transmitted to the streetlights. For this purpose, in the vehicle, a corresponding device or devices, for example, the navigation device 9, are connected to the device for wireless communication. In addition, an approach alarm 8 is connected to the device for wireless communication.

Figure 2:
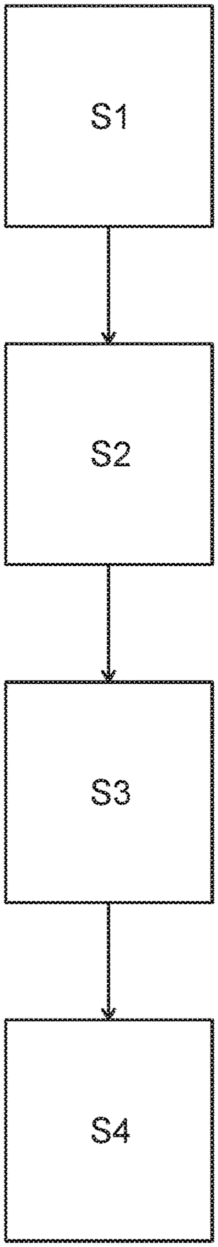
FIG. 2 shows a flow diagram of a specific embodiment of the method according to the present disclosure.

In a method according to FIG. 2, in a first step S1, a first control command is transmitted from the vehicle 2 to the streetlights 3. For this purpose, for example, a function of a a blinker 7 is functionally linked to a function of the streetlight 3. Thus, if the blinker 7 is switched to blink on a right in order to indicate that the vehicle is to turn into a next side street 4*a* on the right, a signal is transmitted to the streetlights 3. In a second step S2, the streetlights 3*a* along the street 4 on which the vehicle is currently present are switched on up to a junction of the side street 4*a* and along the side street 4*a*. The streetlights 3*b* on another side of the junction of the side street 4*a* remain switched off. Ideally, the method is carried out in dark, so transmission of control commands is linked to a function of vehicle lighting, in particular headlights.

If the vehicle 2 has driven through a zone of a current street 4 and the side street 4*a*, in a third step S3, a second control command is transmitted to the streetlights 3*a*. In a fourth step S4, the streetlights 3*a* are then switched off again.

Alternatively or in addition to illuminating a side street 4*a*, for example, a bicycle path 5 may also be illuminated as a vehicle approaches. For this purpose, in step S1, the vehicle 2 transmits a control command as it approaches the streetlights 3, whereupon in step S2, the streetlights 3*a* are switched on. The control command may come from a bicycle on the bicycle path 5 as well as from the vehicle 2 on the street 4. After passing the zone of the current street 4, in step S3, the second control command is transmitted to the streetlights 3*a*, which are then switched off again in step S4.

In an additional embodiment of the method, the navigation device 9 is linked to an arrangement of streetlights 3*c* that illuminate the destination 6 of the vehicle 2, for example, a residence 6 (FIG. 1). In this case, when setting the residence 6 as the navigation destination in step S1, a control command is transmitted to the streetlights 3*c*, which are then switched on in step S2. The streetlights 3*c* may, for example, be switched on if the vehicle 2 comes within one kilometer of the residence 6. The driver of the vehicle 2 subsequently encounters an access to the residence 6 and an area around it, which are illuminated. After reaching the residence 6, after transmitting a control command in step S3, the streetlights 3*c* are switched off in step S4.

In a modification of the method, alternatively to a residence 6, a parking space or a street block that have been entered into the navigation device 9 as a destination may be illuminated. Furthermore, on the basis of the information that the navigation device 9 transmits to infrastructural lighting, a row of streetlights may be illuminated up to an intended destination, acting as a kind of signpost in the sense of providing a visual guidance signal for the vehicle 2.

The street lighting also may be used as a visual guidance signal in interaction with the navigation device 9 of the vehicle 2, or also without the navigation device 9, in order to guide the vehicle 2, for example, out of traffic congestion.

In an additional embodiment, for example, street intersections, street ends, or entrances or exits onto the street 4 may be illuminated. In this case, the signal for activating the corresponding illumination may come from a vehicle 2 on the street 4 as well as from a vehicle 2 that, for example, intends to travel from a driveway onto the street 4.

In other embodiments, in addition to or alternatively to streetlights, construction site lighting may be activated when the vehicle 2 approaches. For this purpose, the vehicle 2 may communicate with construction site lighting that is configured for wireless communication with the vehicle 2 in a manner as described above for the streetlights 3. In a similar manner, as the vehicle 2 approaches, light markers may be activated on the street in order to guide the vehicle 2. Similarly, for example, any other obstacle, for example, a stranded vehicle, may be illuminated.

Furthermore, in an additional embodiment of the method, drivers may be warned if a vehicle is traveling in a wrong direction. For this purpose, for example, a certain rhythm of illumination of streetlights or warning lights may be provided in order to warn both the driver traveling in the wrong direction and other road users.

Furthermore, the streetlights 3 may also be switched on if persons or animals are present on the street 4. For this purpose, movement on the street 4 is detected by corresponding devices in the area of the street lighting. As a vehicle 2 approaches, the streetlights 3 are then switched on. If pedestrians approach, for example, a pedestrian crossing may be dynamically generated by lighting devices integrated into the street 4, in order to allow people to cross the street. For this purpose, ideally, street lighting in the form of streetlights 3 is also switched on.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to operate a system having at least one vehicle for communicating with infrastructure lighting comprising:

switching on a light source of the infrastructure lighting via wirelessly transmitting a first control command to the light source; and switching off the light source via transmitting a second control command to the light source, wherein a blinker is functionally linked to the light source such that activation of the blinker triggers the transmitting of the first control command to light source responsive to vehicle headlights being switched on.

2. The method as claimed in claim 1, wherein the light source is a street lighting device that is switched on at a certain distance as the vehicle approaches.

3. The method as claimed in claim 1, wherein activation of the blinker switches on the light source on a branching street that branches off a present street with respect to a direction of the branching street.

4. The method as claimed in claim 1, wherein the light source is disposed along a bicycle path being switched on at a certain distance as the vehicle approaches.

5. The method as claimed in claim 1 further comprising functionally linking a navigation device to the light source such that the light source is switched on at a certain distance of the vehicle from a programmed destination of the light source.

6. The method as claimed in claim 5, wherein the light source is a street light arranged in a direction of the programmed destination to facilitate route guidance.

7. The method as claimed in claim 1, wherein the light source is lit in a temporal or individual pattern.

8. The method as claimed in claim 1 further comprising switching on the light source in response to a triggered approach alarm.

9. A vehicle comprising:

a blinker functionally linked to a streetlight; and a navigation device communicable with the blinker such that activation of the blinker transmits a first control command from the navigation device to the streetlight if vehicle headlights are switched on, wherein the first control command is transferred wirelessly from the navigation device to the streetlight to switch on the streetlight, and a second control command switches off the streetlight.

10. The vehicle as claimed in claim 9, wherein the first control command is transmitted at a distance as the vehicle approaches to switch on the streetlight.

11. The vehicle as claimed in claim 9, wherein the streetlight is disposed on a branching street that intersects with a current street in a direction indicated by the blinker.

12. The vehicle as claimed in claim 9, wherein the streetlight is disposed a bicycle path that is switched on via the first control command at a certain distance as the vehicle approaches.

13. The vehicle as claimed in claim 9, wherein the navigation device is configured to switched on the streetlight being a certain distance from a destination.

14. The vehicle as claimed in claim 9, wherein the first control command activated the streetlight in a temporal and individual pattern.

15. A vehicle lighting system comprising:

a navigation device communicable with a blinker and headlights such that, if the headlights are switched on, activation of the blinker transmits a first control command from the navigation device to a streetlight disposed on a street extending in a direction indicated by the blinker, wherein the first control command is transferred wirelessly from the navigation device to the streetlight to switch on the streetlight, and a second control command switches off the streetlight.

16. The vehicle lighting system as claimed in claim 15, wherein the first control command is transmitted at a distance as the vehicle approaches to switch on the streetlight.

17. The vehicle lighting system as claimed in claim 15, wherein the streetlight is disposed a bicycle path that is switched on via the first control command at a certain distance as the vehicle approaches.

18. The vehicle lighting system as claimed in claim 15, wherein the navigation device is configured to switched on the streetlight being a certain distance from a destination.

19. The vehicle lighting system as claimed in claim 15, wherein the first control command activates the streetlight in a temporal and individual pattern.

20. The vehicle lighting system as claimed in claim 15, wherein the first control command is transmitted in response to a triggered approach alarm.

* * * * *